United States Patent
Gila et al.

(10) Patent No.: US 7,289,458 B2
(45) Date of Patent: Oct. 30, 2007

(54) METHOD FOR TRANSMITTING DATA BETWEEN A READ/WRITE DEVICE AND A DATA MEMORY, USE OF THE METHOD IN AN IDENTIFICATION SYSTEM AND A READ/WRITE DEVICE AND MOBILE DATA MEMORY FOR AN IDENTIFICATION SYSTEM

(75) Inventors: Janos Gila, Moedling (AT); Kurt Rauscher, Tulln (AT)

(73) Assignee: Siemens AG, Munich (DE)

( * ) Notice: Subject to any disclaimer, the term of this patent is extended or adjusted under 35 U.S.C. 154(b) by 998 days.

(21) Appl. No.: 10/401,544

(22) Filed: Mar. 31, 2003

(65) Prior Publication Data

US 2003/0214934 A1 Nov. 20, 2003

Related U.S. Application Data

(63) Continuation of application No. PCT/DE02/02769, filed on Jul. 29, 2002.

(30) Foreign Application Priority Data

Jul. 30, 2001 (DE) .................. 101 37 247

(51) Int. Cl.
*H04B 7/005* (2006.01)
*H04B 1/44* (2006.01)
*G08B 26/00* (2006.01)

(52) U.S. Cl. ............... 370/278; 370/282; 370/294; 340/505

(58) Field of Classification Search ............ None
See application file for complete search history.

(56) References Cited

U.S. PATENT DOCUMENTS 5,929,779 A * 7/1999 MacLellan et al. ........ 340/10.2

(Continued)

FOREIGN PATENT DOCUMENTS

DE 198-59-947 C2 7/2000

(Continued)

OTHER PUBLICATIONS

Craig K. Harmon, "Working Draft—Radio Frequency Identification Standard for Item Management—Airinterface", ISO/IEC JTC I/SC 31 WG4 ON RFID, Apr. 8, 2000.
German Office Action dated Feb. 28, 2007.

*Primary Examiner*—Chi Pham
*Assistant Examiner*—Soon D. Hyun
(74) *Attorney, Agent, or Firm*—Sughrue Mion Pllc.

(57) ABSTRACT

A method for transmitting data between a read/write unit (SLG) and one or more mobile data stores (D, HD) in an identification system. The method includes dividing the data transmission occurring between the read/write unit (SLG) and the data stores (D, HD) into a plurality of timeslots (SLOT), subframes (SUBFRAME) and frames. An identification timeslot (S-CH) from the respective data store (D, HD) is received and evaluated in at least one evaluation timeslot (SOa) and the data store is identified as a mobile high-speed data store (HD) if the identification timeslot (S-CH) is a high-speed identification timeslot ($S_{31,0}$, $S_{0,31}$), and an associated data-store identifier block (MB2) is evaluated at least beginning during the subsequent timeslot after the identification timeslot (S-CH) onward. The method provides for very rapid detection of high-speed data stores (HD).

20 Claims, 2 Drawing Sheets

U.S. PATENT DOCUMENTS

| | | | |
|---|---|---|---|
| 6,275,476 B1 * | 8/2001 | Wood, Jr. | 370/312 |
| 6,377,203 B1 * | 4/2002 | Doany | 342/44 |
| 6,720,888 B2 * | 4/2004 | Eagleson et al. | 340/905 |
| 7,016,647 B2 * | 3/2006 | Albert et al. | 455/41.2 |

FOREIGN PATENT DOCUMENTS

| | | |
|---|---|---|
| DE | 199 32 455 A1 | 4/2001 |
| EP | 1107163 A1 | 6/2001 |

* cited by examiner

METHOD FOR TRANSMITTING DATA BETWEEN A READ/WRITE DEVICE AND A DATA MEMORY, USE OF THE METHOD IN AN IDENTIFICATION SYSTEM AND A READ/WRITE DEVICE AND MOBILE DATA MEMORY FOR AN IDENTIFICATION SYSTEM

This is a Continuation of International Application PCT/DE02/02769, with an international filing date of Jul. 29, 2002, which was published under PCT Article 21(2) in German, and the disclosure of which is incorporated into this application by reference.

FIELD OF AND BACKGROUND OF THE INVENTION

The invention generally relates to a method for data transmission between a read/write unit and a mobile data store. More particularly, the invention relates to the use of such a method in an identification system having a read/write unit and a mobile data store.

Conventional identification systems contain at least one fixed read/write unit that contactlessly interchanges data with mobile data stores, for example, via a radio-based data transmission link. This type of system is used, for example, in technical facilities where a large number of objects or goods need to be moved as quickly as possible and with the greatest possible degree of freedom. The objects or goods can be of a wide variety of types, e.g., packages in a dispatch facility, fitting parts in a production plant, items of luggage in a transport system, etc. In this context, it is often necessary, e.g., in a production plant, to detect the type and status of the objects currently situated in physical proximity to particular locations in the facility. Further, the detection must be done quickly and unimpeded. To this end, the objects are initially provided with mobile data stores containing data which identify, for example, the type and current state of the object. Secondly, read/write units are placed at the particular locations in the facility and are frequently connected to central data processing devices.

If, for instance, a production cycle involves such objects being conveyed into the physical proximity of a selected location, then the fixed read/write unit arranged at that location can contactlessly detect the data in the mobile data stores on the objects currently situated within its respective detection range and can alter the data if necessary. A superordinate central data processing device can then be used to evaluate the data read from the data store for different purposes, e.g., to track the progress of the objects provided with the mobile data stores and, on the basis thereof, control operating systems in the respective technical facility.

An example of such a conventional identification system is described in the ISO/IEC JTC 1/SC 31 WG4 draft standard entitled "Radio-frequency Identification Standard for Item Management—Air Interface, Part 4—Parameters for Air Interface Communication at 2.45 GHz (WD 18000-4), dated Apr. 8, 2000, which is hereby incorporated by reference for all it teaches.

One notable drawback with the system disclosed in the above-mentioned draft standard, however, is that, particularly for high-speed applications such as detection and identification of railway carriages, the fastest possible processing time of approximately 15 ms is not adequate.

OBJECTS OF THE INVENTION

Accordingly, an object of the present invention is to provide an improved method for data transmission between a read/write unit and a data store. A further object is to specify a use of such a method, for example, in an identification system. An even further object is to provide a read/write unit and a mobile data store for such an identification system, which facilitates faster detection and evaluation of mobile data stores than has previously been known.

SUMMARY OF THE INVENTION

According to one embodiment of the invention, a method is provided for transmitting data between at least one read/write unit and at least one mobile data store in which the method includes initially providing a plurality of successive time slots, each time slot representing a respective amount of time. Further, at least one response sequence is received from one of the mobile data stores within at least two successive evaluation timeslots and each evaluation timeslot corresponds to a respective one of the plurality of timeslots. Additionally, each response sequence includes at least one identification timeslot and a data-store identifier, and the identification timeslot includes an identifier for evaluating the data-store identifier for a corresponding mobile data store at least starting from a timeslot subsequent to the next timeslot after the identification timeslot and continuing onward.

Accordingly, one inventive aspect of the data transmission method is that it is based on an identification timeslot from a mobile data store being received and evaluated by the read/write unit in at least one evaluation timeslot within the time allotted for a single subframe.

BRIEF DESCRIPTION OF THE DRAWINGS

The above and other objects are explained in more detail in the figures below, in which.

DETAILED DESCRIPTION OF THE PREFERRED EMBODIMENTS

Figure 1:
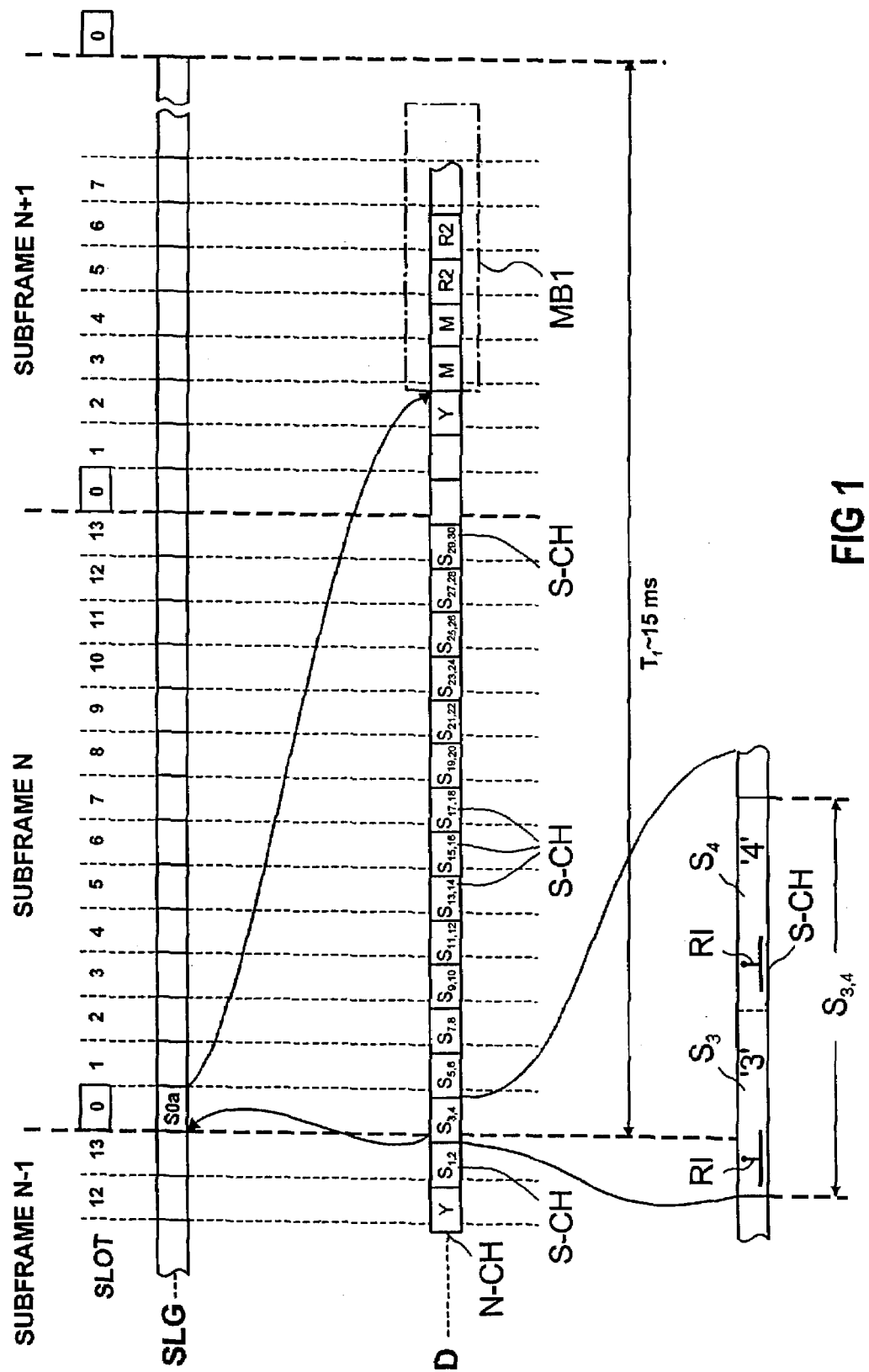
FIG. 1 illustrates an example of a conventional method for identifying a mobile data store in accordance with the aforementioned draft standard.

To more fully understand the present invention, a description of a conventional identification system is initially provided. For example, FIG. 1 illustrates a method for identifying a mobile data store D according to the aforementioned draft ISO standard. As illustrated, the object of this conventional method is to divide the data transmission between a read/write unit SLG and the mobile data stores D into a plurality of timeslots SLOT. This involves combining a subset of timeslots SLOT into one subframe (SUBFRAME=SLOT1+SLOT2+. . . +SLOTn) and combining a plurality of subframes SUBFRAME into one frame (FRAME=SUBFRAME1+SUBFRAME2+. . . +SUBFRAMEm). In the example of FIG. 1, there are 14 timeslots SLOT per subframe in accordance with the aforementioned draft standard. In addition, each of the subframes SUBFRAME are associated with individual respective mobile data stores D.

In general, the method shown in FIG. 1, for data transmission from a read/write unit SLG to a mobile data store D, and from a mobile data store D to the read/write unit SLG, is a time division duplex TDD method. The assignment of the individual timeslots SLOT or subframes SUBFRAMES to different mobile data stores D allows data to be continuously interchanged between a read/write unit SLG and a large number of mobile data stores D. Such a method can be referred to as a time division multiple access TDMA method. Both methods, TDD and TDMA, are based on allocation of timeslots.

In the example shown in FIG. 1, in accordance with the aforementioned draft standard, a test for the presence of a mobile data store D is always carried out in the first timeslot SLOT0, of a particular subframe. Accordingly, as shown, in read/write unit SLG this first timeslot is designed as an evaluation timeslot S0a. In this case, transmitting an unmodulated carrier signal effectively "requests" that a mobile data store D, which can be detected within the reception range of the read/write unit, modulate this carrier frequency with a response sequence N-CH using the "backscattering" method.

An exemplary, cyclically transmitted, response sequence N-CH is shown in FIG. 1. Accordingly, the transmitted response sequence N-CH contains successive identification timeslots S-CH after a transient timeslot Y, starting with the identification timeslot S1,2 and ending with the identification timeslot S29,30. In this case, the identification timeslots S-CH each contain two half-timeslots S1-S30 which can be evaluated by the read/write unit SLG to derive a respective reference pulse RI and a counter reading '1' to '30' in line with the numbering of the half-timeslots S1-S30.

In the example in FIG. 1, a continuous 5-bit counter is provided in this context, with the possible counter readings '0' and '31' not being used. The respective counter reading is used for temporal synchronization between the reference pulse RI for the respective mobile data store D and the time base for the read/write unit SLG, by converting the counter reading into a corresponding time offset. This means that, in the evaluation timeslot S0a in the timeslot SLOT0, it is possible to detect a half-timeslot S1-S30 in the corresponding identification timeslot S-CH for the purpose of synchronization.

In the example in FIG. 1, detection of the half-timeslot S4 can be identified by the counter reading 4. The read/write unit SLG evaluates this half-timeslot S4 and synchronizes its own timing to the detected mobile data store D. In the next subframe SUBFRAME N+1, the data-store identifier MB1 associated with the mobile data store D is evaluated. Thus, according to the draft standard described above, at least two subframes SUBFRAME N, SUBFRAME N+1 are required for detecting and evaluating a mobile data store D. According to the above-referenced draft standard, two subframes is equivalent to a period T1 of approximately 15 ms.

The aforementioned data-store identifier MB1 contains, by way of example, the ID (identification number) or manufacturer details of the detected mobile data store D. The aforementioned draft standard additionally describes different proposals for structuring the data-store identifier MB1. In this context, the selection of a suitable proposal can be based on the particular application.

Figure 2:
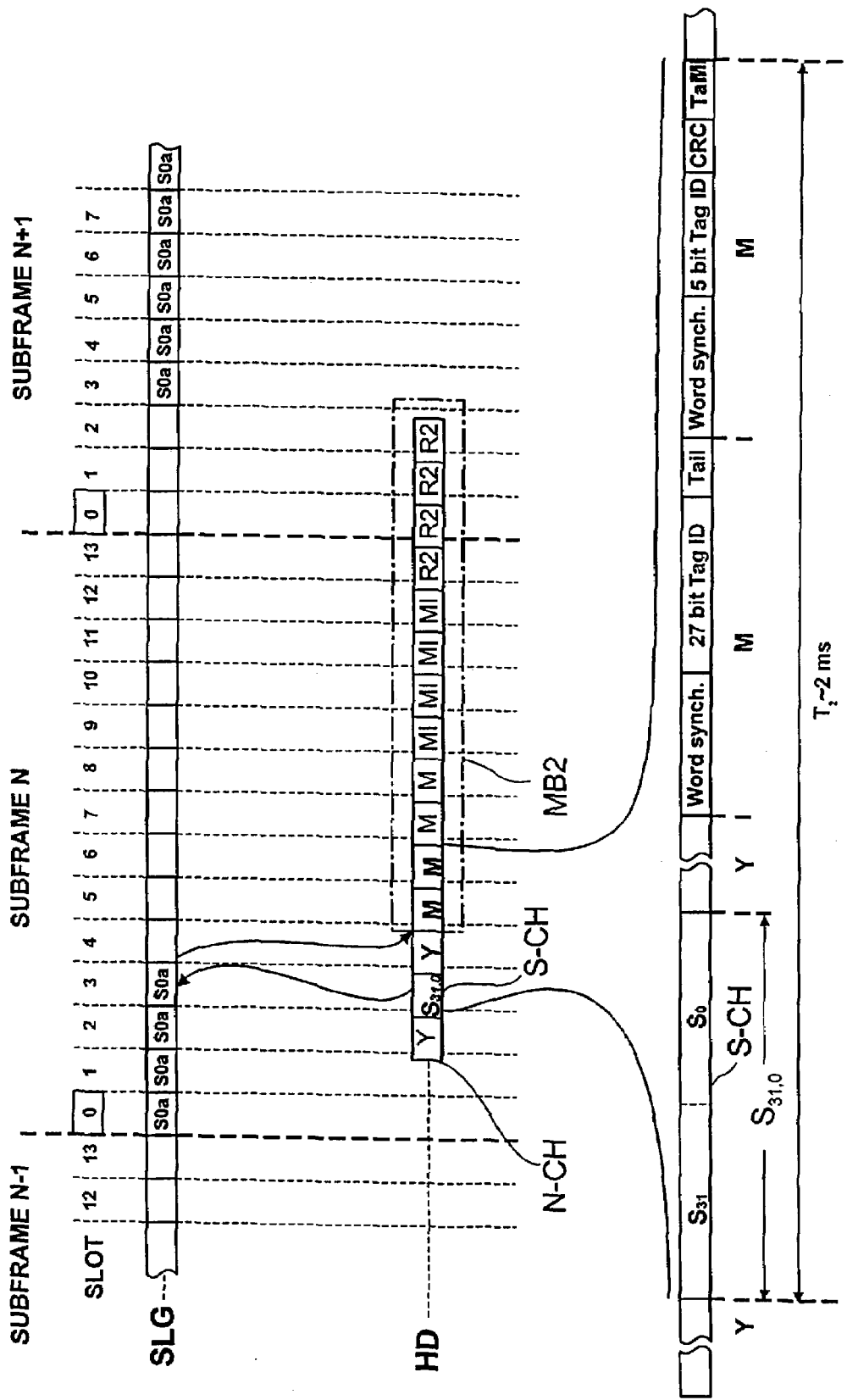
FIG. 2 illustrates an example of a method for faster detection and evaluation of a mobile data store according to the invention.

FIG. 2 exemplifies a method according to the present invention for faster detection and evaluation of a mobile data store D (FIG. 1), particularly a high-speed data store HD. The embodiment illustrated in FIG. 2 involves at least one timeslot from SLOT0-SLOT13 in a subframe SUBFRAME having an associated evaluation timeslot S0a in which a mobile high-speed data store HD can be addressed for the purpose of identification. It is also possible for the other mobile data stores D from FIG. 1 to be addressed in the timeslot SLOT0 for the purpose of interrogation, according to the aforementioned draft standard. In the embodiment of FIG. 2, interrogation is carried out in timeslots SLOT0 to SLOT3 which is successful in timeslot SLOT3 as a result of evaluation of the identification timeslot S-CH, S31,0. Thereafter, further interrogation from timeslot SLOT4 onward is stopped on account of the evaluation of the mobile high-speed data store HD which can, thus, be carried out.

In addition, the present invention involves the use of the two free counter readings '0' and '31' to allow a novel high-speed data store HD to be interrogated and evaluated by evaluating a high-speed identification timeslot S31,0 or, depending on the way in which they are numbered, S0,31. In line with the invention, a mobile high-speed data store HD is identified following evaluation of half a timeslot, S0 or S31, associated with the high-speed identification timeslot S31,0.

Furthermore, according to this embodiment of the invention, the immediately following timeslot, within the remainder of timeslots SLOT0-SLOT13, is used for evaluating the associated data-store identifier block MB2. For example, as shown FIG. 2, evaluation of the data-store identifier block MB2 begins in timeslot SLOT5, after identification of the high-speed data store HD in timeslot SLOT3. In the example in FIG. 2, a possible structuring for the data-store identifier MB1 in line with the aforementioned draft standard has been selected for reasons of simplicity. To this end, the bottom part of FIG. 2 shows, by way of example, a very short structure for the data-store identifier MB2 which allows evaluation of a 32-bit identification number (27 bits+5 bits).

In line with the invention, the method can also be used in an identification system having at least one read/write unit SLG and a mobile data store HD. In addition, the aforementioned read/write unit SLG can be used for data transmission with at least one mobile data store HD, and the mobile data store HD can be used for data transmission with at least one aforementioned read/write unit. This has the associated advantage that, unlike a method according to the aforementioned draft standard, it is not necessary to wait until the next timeslot SLOT0 in the subsequent subframe SUBFRAME N+1 in order to interrogate a mobile high-speed data store HD.

Another advantage afforded by the invention is that the subsequent evaluation of the data-store identifier MB2 allows very rapid detection of high-speed data stores HD. In the example in FIG. 2, the detection period T2 is therefore only approximately 2 ms, in comparison with the 15 ms cited for the conventional example of FIG. 1.

Another advantage is that the inventive method for data transmission can also continue to detect and evaluate the other mobile data stores D from FIG. 1 in line with the aforementioned draft standard.

The above description of the preferred embodiments has been given by way of example. From the disclosure given, those skilled in the art will not only understand the present invention and its attendant advantages, but will also find apparent various changes and modifications to methods disclosed. It is sought, therefore, to cover all such changes and modifications as fall within the spirit and scope of the invention, as defined by the appended claims, and equivalents thereof.

What is claimed is:

1. A method for transmitting data between at least one read/write unit and at least one mobile data store, the method comprising:
   providing a plurality of successive time slots, each time slot representing a respective amount of time;
   receiving at least one response sequence from one of the mobile data stores within at least two successive evaluation timeslots, each evaluation timeslot corresponding to a respective one of the plurality of timeslots, wherein each response sequence comprises at least one identification timeslot and a data-store identifier, and the identification timeslot comprises an identifier for evaluating the data-store identifier for a corresponding mobile data store at least from a subsequent timeslot onward,
   detecting presence of the mobile data store based on said at least one identification timeslot; and
   identifying the mobile data store based on the data-store identifier,
   wherein said at least one identification timeslot and said data-store identifier are in one subframe.

2. The method as claimed in claim 1, further comprising:
   combining a plurality of timeslots into a subframe; and
   combining a plurality of subframes into a frame,
   wherein each subframe is associated with a respective mobile data store.

3. The method as claimed in claim 1, wherein an identification timeslot from the corresponding mobile data store is received and evaluated by the read/write unit in at least one evaluation timeslot within a subframe.

4. The method as claimed claim 1, wherein the at least one identification timeslot is divided into two respective timeslot halves which are assigned revolving successive counter readings.

5. The method as claimed in claim 4, wherein at least one of the two timeslot halves with the counter readings within the identification timeslot identifies the mobile data store as a high-speed data store.

6. The method as claimed in claim 1, wherein reception and evaluation of the identification timeslot is preceded by the read/write unit transmitting a carrier signal to interrogate the corresponding contactable mobile data store.

7. The method as claimed in claim 1, wherein the data transmission method is a time division duplex TDD method.

8. The method as claimed in claim 1, wherein the data transmission method is a time division multiple access TDMA method.

9. The method as claimed in claim 1, wherein said at least one read/write unit receives the at least one response sequence from said one of the mobile data stores and identifies said one of the mobile data stores based on said at least one response sequence.

10. The method as claimed in claim 9, wherein the identification is in accordance with the ISO/IEC 18000 standard for operation in an ISM frequency band.

11. The method as claimed in claim 10, wherein the identification is in an ISM frequency band of 2.45 GHz.

12. The method as claimed in claim 10, wherein the identification is operated in an ISM frequency band of 5.6 GHz.

13. The method as claimed in claim 10, wherein the identification is operated in an ISM frequency band in the UHF frequency range.

14. The method as claimed in claim 1, wherein the at least one mobile data store comprises a high speed mobile data store and a slow speed mobile data store and wherein the read/write unit is configured to receive and evaluate a high-speed evaluation time slot transmitted by the high speed mobile data store and a slow-speed evaluation timeslot transmitted by the low speed mobile data store.

15. The method as claimed in claim 1, wherein:
   the at least one timeslot comprises a fist timeslot and a second timeslot;
   the first timeslot is designated in the read/write unit as a high-speed evaluation timeslot and the second timeslot is designated as a slow-speed evaluation timeslot;
   a high-speed response sequence from the high-speed data store is cyclically transmitted, the high-speed response sequence comprises at least a high-speed identification timeslot configured to identify the high-speed sequence as originating from a high-speed data store, and a high-speed data store identifier block comprising an identification number configured to identify the high-speed data store from which the high-speed response sequence was transmitted;
   a slow-speed response sequence from a slow-speed data store is cyclically transmitted; and
   the slow-speed response sequence comprises at least a plurality of slow-speed identification timeslots configured to identify the slow-speed response sequence as originating from a slow-speed data store, and a slow-speed data store identifier block configured to identify the slow-speed data store from which the slow-speed response sequence was transmitted.

16. A device comprising:
   a read/write unit to transmit data; and
   at least one mobile data store to receive the transmitted data from said read/write unit and transmit a response,
   wherein a plurality of successive time slots are provided, each time slot representing a respective amount of time and at least one response sequence from one of the at least one mobile data store is transmitted within at least two successive evaluation timeslots, each evaluation timeslot corresponding to a respective one of the plurality of timeslots, and wherein further, each response sequence comprises at least one identification timeslot and a data-store identifier, and the identification timeslot comprises an identifier for evaluating the data-store identifier for a corresponding mobile data store at least from a subsequent timeslot onward,
   wherein presence of the mobile data store is detected based on said at least one identification timeslot and the mobile data store is identified based on the data-store identifier and wherein the at least one identification timeslot and the data-store identifier are provided in one subframe.

17. The device as claimed in claim 16, wherein:
   the at least one timeslot comprises a fist timeslot and a second timeslot;
   the first timeslot is designated in the read/write unit as a high-speed evaluation timeslot and the second timeslot is designated as a slow-speed evaluation timeslot;
   a high-speed response sequence from the high-speed data store is cyclically transmitted, the high-speed response sequence comprises at least a high-speed identification timeslot configured to identify the high-speed sequence as originating from a high-speed data store, and a high-speed data store identifier block comprising an identification number configured to identify the high-speed data store from which the high-speed response sequence was transmitted;
   a slow-speed response sequence from a slow-speed data store is cyclically transmitted; and the slow-speed response sequence comprises at least a plurality of slow-speed identification timeslots configured to identify the slow-speed response sequence as originating from a slow-speed data store, and a slow-speed data store identifier block configured to identify the slow-speed data store from which the slow-speech response sequence was transmitted.

18. A method for transmitting data between a read/write unit and a high-speed data store, the method comprising:

providing a frame corresponding to an amount of time, the frame comprising a plurality of subframes, wherein each subframe comprises a plurality of successive timeslots;

designating at least one timeslot in the read/write unit as a high-speed evaluation timeslot;

cyclically transmitting a high-speed response sequence from the high-speed data store, wherein the high-speed response sequence comprises at least a high-speed identification timeslot to identify the high-speed sequence as originating from a high-speed data store, and a high-speed data store identifier block comprising an identification number to identify the high-speed data store from which the high-speed response sequence was transmitted;

identifying, during one of the at least one high-speed evaluation timeslots, the high-speed identification timeslot transmitted from the read/write unit;

identifying the high-speed data store from which the high-speed response sequence was transmitted at least during a timeslot immediately subsequent to a transient timeslot, wherein the transient timeslot is immediately subsequent to the high-speed identification timeslot;

designating the first timeslot of a subframe as a slow-speed evaluation timeslot; and cyclically transmitting a slow-speed response sequence from a slow-speed data store, wherein the slow-speed response sequence comprises at least a plurality of slow-speed identification timeslots configured to identify the slow-speed response sequence as originating from a slow-speed data store, and a slow-speed data store identifier block configured to identify the slow-speed data store from which the slow-speed response sequence was transmitted.

19. A method as claimed in claim 18, wherein said identifying the high-speed identification timeslot and said identifying the high-speed data store from which the high-speed response sequence was transmitted occurs within a single subframe.

20. A method as claimed in claim 18 wherein the slow-speed identification timeslots and the slow-speed data store identifier block occur in separate subframes.

* * * * *